(12) United States Patent
Jung

(10) Patent No.: US 12,392,019 B2
(45) Date of Patent: *Aug. 19, 2025

(54) WIRE ROD FOR COLD HEADING HAVING EXCELLENT DELAYED FRACTURE RESISTANCE CHARACTERISTICS, PARTS, AND MANUFACTURING METHOD THEREFOR

(71) Applicant: POSCO CO., LTD, Pohang-si (KR)

(72) Inventor: Byung-In Jung, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 508 days.

This patent is subject to a terminal disclaimer.

(21) Appl. No.: 17/783,378

(22) PCT Filed: Dec. 15, 2020

(86) PCT No.: PCT/KR2020/018363
§ 371 (c)(1),
(2) Date: Jun. 8, 2022

(87) PCT Pub. No.: WO2021/125749
PCT Pub. Date: Jun. 24, 2021

(65) Prior Publication Data
US 2023/0023191 A1    Jan. 26, 2023

(30) Foreign Application Priority Data
Dec. 17, 2019   (KR) .................. 10-2019-0169264

(51) Int. Cl.
| C22C 38/46 | (2006.01) |
| C22C 38/02 | (2006.01) |
| C22C 38/04 | (2006.01) |
| C22C 38/44 | (2006.01) |

(52) U.S. Cl.
CPC ............ *C22C 38/46* (2013.01); *C22C 38/02* (2013.01); *C22C 38/04* (2013.01); *C22C 38/44* (2013.01)

(58) Field of Classification Search
CPC ......... Y02P 10/20; C22C 38/02; C22C 38/04; C22C 38/44; C22C 38/46; C21D 2211/008; C21D 2211/002; C21D 1/26; C21D 1/22; C21D 1/20; C21D 1/18; C21D 1/02; C21D 6/004; C21D 6/02
See application file for complete search history.

(56) References Cited

U.S. PATENT DOCUMENTS

| 5,073,338 | A | * | 12/1991 | Furusawa | ............... | C22C 38/28 420/110 |
| 11,905,571 | B2 | * | 2/2024 | Jung | .................. | C21D 6/008 |

| 2018/0363081 | A1 | | 12/2018 | Lee et al. | | |
| 2019/0024222 | A1 | | 1/2019 | Okonogi et al. | | |
| 2021/0324493 | A1 | | 10/2021 | Jung et al. | | |
| 2023/0029137 | A1 | * | 1/2023 | Jung | .................. | C21D 1/25 |
| 2024/0052467 | A1 | * | 2/2024 | Jung | ................... | C22C 38/02 |

FOREIGN PATENT DOCUMENTS

| CN | 108368587 A | 8/2018 |
| CN | 110468340 A | 11/2019 |
| JP | H06-306543 A | 11/1994 |
| JP | 2003-183733 A | 7/2003 |
| JP | 2011-047010 A | 3/2011 |
| JP | 2001-062639 A | 3/2013 |
| KR | 10-2000-0042531 A | 7/2000 |
| KR | 10-2002-0034474 A | 5/2002 |
| KR | 10-2003-0054376 A | 7/2003 |
| KR | 10-0470671 B1 | 3/2005 |
| KR | 10-2006-0057800 A | 5/2006 |
| KR | 10-0723186 B1 | 5/2007 |
| KR | 10-2007-0068511 A | 7/2007 |
| KR | 10-0833079 B1 | 5/2008 |
| KR | 2013-237903 A | 11/2013 |
| KR | 10-2018-0090884 A | 8/2018 |
| KR | 10-2019-0074779 A | 6/2019 |
| KR | 10-2019-0078129 A | 7/2019 |
| KR | 10-2020-0025713 A | 3/2020 |
| WO | 2007/074986 A1 | 7/2007 |
| WO | 2007074984 A1 | 7/2007 |

OTHER PUBLICATIONS

International Search Report dated Sep. 27, 2020 issued in International Patent Application No. PCT/KR2020/018363 (with English translation).

Extended European Search Report dated May 15, 2024 issued in European Patent Application No. 20902835.6.

Chinese Office Action dated Feb. 2, 2023 issued in Chinese Patent Application No. 202080086520.2.

* cited by examiner

*Primary Examiner* — Jie Yang
(74) *Attorney, Agent, or Firm* — Morgan, Lewis & Bockius LLP

(57) ABSTRACT

Provided are a wire rod for cold heading having high resistance to delayed facture, a part having high resistance to delayed facture, and methods for manufacturing the wire rod and the part. The wire rod of the present disclosure has a chemical composition including, by wt %, C: 0.3% to 0.5%, Si: 0.01% to 0.3%, Mn: 0.3% to 1.0%, Cr: 0.5% to 1.5%, Mo: 0.5% to 1.5%, Ni: 0.5% to 2.0%, V: 0.01% to 0.4%, and a balance of Fe and other impurities, and the chemical composition satisfies the relational expression 1, wherein the high-strength wire rod has a microstructure including, by area %, 5% to 20% martensite, 0.1% to 1% pearlite, and a balance of bainite.

3 Claims, No Drawings

WIRE ROD FOR COLD HEADING HAVING EXCELLENT DELAYED FRACTURE RESISTANCE CHARACTERISTICS, PARTS, AND MANUFACTURING METHOD THEREFOR

CROSS-REFERENCE OF RELATED APPLICATIONS

This application is the U.S. National Phase under 35 U.S.C. § 371 of International Patent Application No. PCT/KR2020/018363, filed on Dec. 15, 2020, which in turn claims the benefit of Korean Application No. 10-2019-0169264, filed on Dec. 17, 2019, the entire disclosures of which applications are incorporated by reference herein.

TECHNICAL FIELD

The present disclosure relates to the manufacturing of a wire rod for cold heading which is used for mechanical structures, automobile parts, etc., and more particularly, to a wire rod for cold heading and a method for manufacturing the wire rod, wherein the content of Si, which is widely known as an element causing solid solution strengthening, is reduced as much as possible to secure cold forgeability, Ni is added to activate lower bainite transformation and secure impact toughness, Mo is added to secure hardenability through delayed transformation of pearlite and bainite, and V is added to increase strength and refine grains, thereby improving resistance to hydrogen-delayed facture after heat treatment.

BACKGROUND ART

General wire rod products for cold heading are used to manufacture mechanical structures, automobile parts, or the like through cold drawing, spheroidizing heat treatment, cold drawing, cold heading, rapid cooling, and tempering. Recent technical trends in developing steel materials for cold heading are to develop wire rods enabling the omission of heat treatment and machining processes and to develop high-strength steel materials for cold heading which enable the production of lightweight automobile parts for complying with global fuel efficiency requirements.

For example, vehicle weight reduction is in progress to comply with global automobile fuel efficiency requirements for improving the atmospheric environment, and to this end, parts such as small, high-power engines have been developed. High-strength steel materials for cold heading are required for manufacturing such small, high-power parts.

High-strength steel materials for cold heading may be rapidly cooled and tempered after a cold heading process. In this case, however, tempered martensite, having a microstructure very sensitive to hydrogen-delayed fracturing at a high load condition of 1300 MPa or more, is formed, and thus it may be difficult to use high-strength steel materials. To address this issue, there is provided a method of using bainite, which is less sensitive to hydrogen-delayed fracturing than tempered martensitic.

However, it takes relatively long time to perform a heat treatment for transformation into bainite, increasing manufacturing costs. Therefore, it is necessary to develop a wire rod for cold heading which requires a relatively short heat treatment time for transformation into bainite.

DISCLOSURE

Technical Problem

An aspect of the present disclosure is to provide a high-strength, high-toughness wire rod having high resistance to hydrogen-delayed fracturing for cold heading and a method for manufacturing the wire rod.

Another aspect of the present disclosure is to provide a high-strength, high-toughness, heat-treated part manufactured using the wire rod, and a method for manufacturing the high-strength, high-toughness, heat-treated part.

Aspects of the present disclosure are not limited to the aspects described above. Those of ordinary skill in the art to which the present disclosure pertains will have no difficulty in understanding other aspects of the present disclosure from the detailed description of the present specification.

Technical Solution

According to an aspect of the present disclosure, a high-strength wire rod with high resistance to hydrogen-delayed fracturing for cold heading has a chemical composition including, by wt %, C: 0.3% to 0.5%, Si: 0.01% to 0.3%, Mn: 0.3% to 1.0%, Cr: 0.5% to 1.5%, Mo: 0.5% to 1.5%, Ni: 0.5% to 2.0%, V: 0.01% to 0.4%, and a balance of Fe and other impurities, and the chemical composition satisfies the relational expression 1 below, the high-strength wire rod has a microstructure including, by area %, 5% to 20% martensite, 0.1% to 1% pearlite, and a balance of bainite, $$1.21Cr + 3.94Mo + 15V \geq 3.567 \quad \text{[Relational expression 1]}$$

where Cr, Mo, and V respectively refer to a content thereof in wt %.

According to another aspect of the present disclosure, there is provided a method for manufacturing a high-strength wire rod having high resistance to hydrogen-delayed fracturing, the method including:

finish rolling a steel material at a temperature of 850° C. to 1100° C. to manufacture a hot-rolled steel material having an average austenite grain size of 30 μm or less, and coiling the hot-rolled steel material, wherein the steel material has a chemical composition including, by wt %, C: 0.3% to 0.5%, Si: 0.01% to 0.3%, Mn: 0.3% to 1.0%, Cr: 0.5% to 1.5%, Mo: 0.5% to 1.5%, Ni: 0.5% to 2.0%, V: 0.01% to 0.4%, and a balance of Fe and other impurities, and the chemical composition satisfies the relational expression 1 above; and cooling the coiled steel material at a cooling rate of 0.1° C./s to 1.0° C./s to manufacture a high-strength wire rod having a microstructure including, by area %, 5% to 20% martensite, 0.1% to 1% pearlite, and a balance of bainite.

According to another aspect of the present disclosure, a high-strength heat-treated part with high resistance to hydrogen-delayed fracturing has a chemical composition including, by wt %, C: 0.3% to 0.5%, Si: 0.01% to 0.3%, Mn: 0.3% to 1.0%, Cr: 0.5% to 1.5%, Mo: 0.5% to 1.5%, Ni: 0.5% to 2.0%, V: 0.01% to 0.4%, and a balance of Fe and other impurities, and the chemical composition satisfies the relational expression 1 below, the high-strength heat-treated part has a microstructure including, by area %, 5% to 20% auto-tempered martensite and a balance of lower bainite, $$1.21Cr + 3.94Mo + 15V \geq 3.567 \quad \text{[Relational expression 1]}$$

where Cr, Mo, and V respectively refer to a content thereof in wt %.

According to another aspect of the present disclosure, there is provided a method for manufacturing a high-strength heat-treated part having high resistance to hydrogen-delayed fracturing, the method including:

cold forging a wire rod having the chemical composition described above and then heating the wire rod to a temperature of 850° C. to 1100° C.;

rapidly cooling the heated wire rod to a temperature of 600° C. to 800° C. and then performing a primary isothermal heat treatment on the wire rod for 600 seconds to 1800 seconds; and performing a secondary isothermal heat treatment at a temperature of 250° C. to 350° C. for 5000 seconds to 10,000 seconds on the wire rod isothermally maintained by the primary isothermal heat treatment, so as to manufacture a heat-treated part having a microstructure including, by area %, 5% to 20% auto-tempered martensite and a balance of lower bainite.

The high-strength heat-treated part manufactured as described above has a tensile strength of 1600 MPa or more and an impact toughness of 60 J or more.

Advantageous Effects

According to the present disclosure, when manufacturing a steel material for cold heading which has high strength, high toughness, and high resistance to hydrogen-delayed fracturing, the composition of the steel material is controlled, and primary and secondary isothermal heat treatment processes are performed during subsequent heat treatment processes after cold forging, so as to secure the formation of lower bainite having high resistance to hydrogen-delayed fracturing and high impact toughness and omit quenching of an existing QT heat treatment to prevent the formation of thin-film-shaped carbides along the grain boundaries of prior austenite, thereby improving resistance to hydrogen-delayed fracturing.

Therefore, according to the present disclosure, a final part obtained after heat treatment may have a tensile strength of 1600 MPa or more and an impact toughness of 60 J or more.

BEST MODE

Hereinafter, the present disclosure will be described.

According to the present disclosure, the content of Si, which is widely known as an element causing solid solution strengthening, is reduced as much as possible to secure cold forgeability, Ni is added to activate lower bainite transformation and secure impact toughness, Mo is added to secure hardenability through delayed transformation of pearlite and bainite, and V is added to refine grains. In addition, the contents of Cr, Mo and V are optimized to increase the strength and hydrogen-delayed fracturing resistance of a wire rod for cold heading.

In addition, a manufactured wire rod is subjected to a primary isothermal heat treatment to precipitate, scatter, and distribute fine nanosized carbides capable of trapping diffusive hydrogen and a secondary isothermal heat treatment to secure the formation of lower bainite having high resistance to hydrogen-delayed fracturing and high impact toughness, and quenching of an existing QT heat treatment is omitted to prevent the formation of thin-film-shaped carbides along the grain boundaries of prior austenite, thereby improving resistance to hydrogen-delayed fracturing. Based thereon, the present disclosure is provided.

First, the compositions of a wire rod and a heat-treated part of the present disclosure, and reasons for limiting the contents of alloying elements of the wire rod and the heat-treaded part of the present disclosure will be described. Herein, "%" refers to wt % unless otherwise specified.

The wire rod and the heat-treated part of the present disclosure each has a chemical composition including, by wt %, C: 0.3% to 0.5%, Si: 0.01% to 0.3%, Mn: 0.3% to 1.0%, Cr: 0.5% to 1.5%, Mo: 0.5% to 1.5%, Ni: 0.5% to 2.0%, V: 0.01% to 0.4%, and a balance of Fe and other impurities, and the chemical composition satisfies the relational expression 1 below.

Composition [Wire Rod and Heat-Treated Part]

C: 0.3% to 0.5%

If the content of C is less than 0.3%, it is not easy to obtain sufficient material strength and secure sufficient hardenability after a final QT heat treatment. In addition, when the content of C exceeds 0.5%, there is a disadvantage in that carbides may be excessively formed, causing a decrease in fatigue life. According to the present disclosure, the lower limit of the content of C is preferably 0.32%, and more preferably 0.35%. In addition, the upper limit of the content of C is preferably 0.47%, and more preferably 0.45%.

Si: 0.01% to 0.3%

Si is an element which is used for deoxidizing steel and is effective in securing strength through solid solution strengthening, but Si deteriorates cold forgeability. If the content of Si is less than 0.01%, it is not sufficient to secure strength through deoxidation and solid solution strengthening of steel. When the content of Si exceeds 0.3%, cold forgeability is lowered, making it difficult to form parts having complex shapes such as bolts.

Mn: 0.3% to 1.0%

Mn is an alloying element, which is advantageous for securing strength by improving hardenability of steel and has a function of increasing rollability and reducing brittleness. When Mn is added in an amount of less than 0.3%, it is difficult to secure sufficient strength. When Mn is added in an amount of greater than 1.0%, a hard microstructure may easily be formed, and MnS inclusion may be formed in a large amount during cooling after hot rolling, thereby deteriorating fatigue properties. Thus, it is necessary to limit the content of Mn. Preferably, the lower limit of the content of Mn may be set to be 0.5%, and the upper limit of the content of Mn may be set to be 0.95%.

Cr: 0.5% to 1.5%

Cr (chromium) is an element effective in improving the hardenability of steel together with Mn and improving the corrosion resistance of steel, and may thus be added in an amount of 0.5% or more. However, if the content of Cr is excessive, impact toughness decreases, and coarse carbides having a negative effect on the resistance to hydrogen-delayed fracturing are formed. Thus, the upper limit of the content of Cr may be set to be 1.5%. Preferably, the content of Cr may be controlled within the range of 0.7% to 1.5%.

Mo: 0.5% to 1.5%

Mo is an element effective in improving hardenability through strengthening by precipitation of fine carbides and solid solution strengthening, and the effect of Mo is much greater than the effect of Mn or Cr. When the content of Mo is less than 0.5%, it is not easy to secure strength after heat treatment because hardenability is not sufficiently secured through pearlite and bainite transformation delay. Conversely, when the content of Mo exceeds 1.5%, transformation to pearlite and bainite is excessively delayed, increasing the time for heat treatment and thus decreasing economical efficiency. Preferably, the content of Mo may be controlled within the range of 0.7% to 1.5%.

Ni: 0.5% to 2.0%

Ni is a non-carbide-forming element and has a function of retarding transformation into ferrite, pearlite, and bainite. During a isothermal heat treatment for bainite, Ni suppresses transformation into upper bainite having a relatively poor combination of strength and toughness and guarantees a sufficient amount of lower bainite having a superior combination of strength and toughness. However, when Ni is added in an amount of less than 0.5%, upper bainite may be formed during cooling because the nose of bainite transformation is not sufficiently shifted to longer times. When Ni is added in an amount of greater than 2.0%, the heat treatment time for bainite transformation increases, decreasing economical efficiency. Thus, it is necessary to limit the content of Ni.

Preferably, the content of Ni may be limited to the range of 0.7% to 2.0%.

V: 0.01% to 0.4%

V is an element refining the microstructure of steel by forming fine carbides such as VC, VN, and V(C, N). When the content of V is less than 0.01%, the distribution of V precipitates in a base material is not sufficient to fix the grain boundaries of austenite, and thus grain coarsening occurs during reheating in a heat treatment process, thereby decreasing strength. Conversely, when the content of V exceeds 0.4%, coarse carbonitrides are formed, which adversely affects toughness. Therefore, in the present disclosure, it is preferable to adjust the content of V to be within the range of 0.01% to 0.4%.

According to the present disclosure, it is required to add Cr, Mo, and V to satisfy the relational expression 1 below.

$$1.21Cr + 3.94Mo + 15V \geq 3.567 \quad \text{[Relational expression 1]}$$

Here, Cr, Mo, and V respectively refer to the content thereof in wt %.

Fine carbides capable of trapping diffusive hydrogen are needed to improve resistance to hydrogen-delayed fracturing. Examples of fine carbides capable of trapping hydrogen include CrC, MoC, and VC which respectively contain Cr, Mo, and V as main components. When the number of particles of these carbides is equal to or greater than a certain value, strength equal to or greater than 1600 MPa may be guaranteed, and the effect of trapping hydrogen may also be maximized. That is, when the contents of Cr, Mo, and V in steel for cold heading are adjusted to be certain values or more to satisfy the relational expression 1 above, the strength and the hydrogen-delayed fraction resistance of the steel for cold heading may be improved.

[Wire Rod Manufacturing Method and Microstructure]

According to the present disclosure, first, a steel material having the composition described above is prepared, and the steel material is heated. Thereafter, finish rolling is performed on the steel material at a temperature of 850° C. to 1100° C. The finish rolling is performed for grain refinement through dynamic recrystallization. If the finish rolling temperature is less than 850° C., a load on rolling equipment is significantly increased, and thus the lifespan of the rolling equipment may be markedly reduced. When the finish rolling temperature exceeds 1100° C., there is a problem in that the effect of refining grains decreases due to rapid grain growth at high temperature.

Through such finish hot rolling, a hot-rolled steel material having a microstructure with an average austenite particle size of 30 μm or less may be manufactured.

Next, according to the present disclosure, the hot-rolled steel material is coiled.

Thereafter, according to the present disclosure, the coiled hot-rolled steel material is cooled to room temperature with a cooling rate of 0.1° C./s to 1.0° C./s.

The cooling enables the manufacture of a high-strength wire rod having high resistance to hydrogen-delayed fracturing for cold heading, the high-strength wire rod having a microstructure containing, by area %, 5% to 20% martensite, 0.1% to 1% pearlite, and a balance of bainite.

[Heat-Treated Part Manufacturing Method and Microstructure]

In the present disclosure, the wire rod having the composition and the internal microstructure described above is subjected to a softening heat treatment at a temperature of 700° C. and 800° C. to lower the strength of the wire rod. Next, according to the present disclosure, the wire rod is cold forged and then heated to a temperature of 850° C. to 1050° C. so as to manufacture a part. The heating is performed to obtain a complete austenitic microstructure. If the heating temperature is less than 850° C., spheroidal cementite does not re-dissolve, causing deterioration of physical properties in a subsequent heat treatment, and if the heating temperature exceeds 1050° C., austenite grains grow excessively, causing deterioration of physical properties in a subsequent heat treatment.

According to the present disclosure, the heated wire rod is rapidly cooled to a temperature of 600° C. to 800° C. and is subjected to a primary isothermal heat treatment for 600 seconds to 1800 seconds. The primary isothermal heat treatment is a process for precipitating and scattering fine carbides capable of trapping diffusive hydrogen. If the temperature of the primary isothermal heat treatment is less than 600° C., sufficient energy for precipitating carbides is not supplied, and thus it may be difficult to secure the formation of fine carbides capable of trapping diffusive hydrogen. When the temperature of the primary isothermal heat treatment exceeds 800° C., precipitated carbides begin to dissolve again, and thus it may be difficult to obtain sufficient amounts of fine carbides capable of trapping diffusive hydrogen. In addition, if the time of the primary isothermal heat treatment is insufficient, the heat treatment effects described above may not be obtained, and if the time of the primary isothermal heat treatment is excessively long, the heat treatment effects are saturated.

The rapid cooling is preferably at a cooling rate of 50° C./s or more. If the cooling rate is less than 50° C./s, bainite or pearlite may be formed instead of martensite.

Furthermore, according to the present disclosure, the wire rod isothermally maintained by the primary isothermal heat treatment is subjected to a secondary isothermal heat treatment at a temperature of 250° C. to 350° C. for 5000 seconds to 10,000 seconds. The secondary isothermal heat treatment is for securing lower bainite and auto-tempered martensite. If the temperature of the secondary isothermal heat treatment is less than 250° C., the fraction of lower bainite is excessively lowered, deteriorating the physical properties of the part, and if the temperature of the secondary isothermal heat treatment exceeds 350° C., upper bainite begins to occur, deteriorating the physical properties of the part.

In the present disclosure, owing to the primary and secondary isothermal heat treatments, lower bainite having high resistance to hydrogen-delayed fracturing and high impact toughness may be guaranteed, and quenching of an existing QT heat treatment may be omitted to prevent the formation of thin-film-shaped carbides along the grain boundaries of prior austenite, thereby improving resistance to hydrogen-delayed fracturing.

In addition, according to the present disclosure, owing to the primary and secondary isothermal heat treatments, a heat-treated part having a microstructure including, by area %, 5% to 20% auto-tempered martensite and a balance of lower bainite may be obtained, and the microstructure may include CrC, MoC, and VC as fine carbides having a size of 500 nm or less. If the fraction of the auto-tempered martensite is excessively high, the heat-treated part may have poor ductility and toughness, and if the fraction of the auto-tempered martensite is excessively low, the heat-treated part may not have intended strength.

The heat-treated part may have a tensile strength of 1600 MPa or more and an impact toughness of 60 J or more.

MODE FOR INVENTION

Hereinafter, the present disclosure will be described in more detail through examples. It should be noted that the following examples are only for the understanding of the present disclosure, and are not intended to specify the scope of the present disclosure.

Example 1

Billets having the compositions shown in Table 1 were prepared.

TABLE 1

| Materials | Composition (wt %) | | | | | | | 1.21Cr + 3.94Mo + 15V |
|---|---|---|---|---|---|---|---|---|
| | C | Si | Mn | Cr | Mo | V | Ni | |
| Inventive Material 1 | 0.38 | 0.13 | 0.52 | 1.22 | 0.64 | 0.12 | 0.52 | 5.7978 |
| Inventive Material 2 | 0.47 | 0.25 | 0.89 | 1.02 | 0.85 | 0.05 | 1.85 | 5.3332 |
| Inventive Material 3 | 0.42 | 0.22 | 0.73 | 0.83 | 0.82 | 0.09 | 1.22 | 5.5851 |
| Inventive Material 4 | 0.43 | 0.27 | 0.91 | 0.98 | 0.54 | 0.19 | 1.33 | 6.1634 |
| Inventive Material 5 | 0.32 | 0.23 | 0.52 | 0.57 | 1.47 | 0.15 | 1.94 | 8.7315 |
| Comparative Material 1 | 0.39 | 0.13 | 0.53 | 1.1 | 0.61 | 0.13 | 0.35 | 5.6844 |
| Comparative Material 2 | 0.46 | 0.25 | 0.89 | 0.78 | 0.78 | 0.05 | 2.25 | 4.767 |
| Comparative Material 3 | 0.39 | 0.12 | 0.54 | 0.32 | 0.51 | 0.07 | 0.61 | 3.4466 |
| Comparative Material 4 | 0.46 | 0.26 | 0.87 | 0.83 | 0.46 | 0.03 | 1.78 | 3.2667 |
| Comparative Material 5 | 0.42 | 0.23 | 0.71 | 0.61 | 0.35 | 0.09 | 1.25 | 3.4671 |
| Comparative Material 6 | 0.42 | 0.25 | 0.83 | 0.34 | 0.32 | 0.12 | 1.36 | 3.4722 |
| Comparative Material 7 | 0.33 | 0.24 | 0.53 | 0.78 | 0.62 | 0.01 | 1.91 | 3.5366 |

The billets prepared with the compositions were heated to a temperature of 900° C. to 1200° C., finish rolled and coiled at a temperature of 850° C. to 1100° C., and then cooled to room temperature at a cooling rate of 0.1° C./s to 1.0° C./s, thereby manufacturing wire rods. The wire rods had microstructures as follows: Inventive Material 1 (M: 7.7%, P: 0.3%, B as a remainder: 92%), Inventive Material 2 (M: 10.9%, P: 0.1%, B as a remainder: 89%), Inventive Material (M: 8.9%, P: 0.2%, B as a remainder: 90.9%), Inventive Material 4 (M: 8.5%, P: 0.2%, B as a remainder: 91.3%), Inventive Material 5 (M: 5.2%, P: 0.9%, B as a remainder: 93.9%), Comparative material 1 (M: 7.2%, P: 0.4%, B as a remainder: 92.4%), Comparative material 2 (M: 7.9%, P: 0.3%, B as a remainder: 91.8%), Comparative material 3 (M: 3.5%, P: 2.1%, B as a remainder: 94.4%), Comparative material 4 (M: 6.5%, P: 0.9%, B as a remainder: 92.6%), Comparative material 5 (M: 5.1%, P: 1.3%, B as a remainder: 93.6%), Comparative material 6 (M: 4.2%, P: 2.3%, B as a remainder: 93.5%), and Comparative 7 (M: 5.1%, P: 1.1%, B as a remainder: 93.7%). In the above, M refers to martensite, P refers to pearlite, and B refers to bainite.

The wire rods prepared as described above were machined as tensile test samples according to ASTM E 8, and then the tensile test samples were heat treated under the conditions shown in Table 2 below. At that time, the tensile test samples were cooled to the temperature of a primary isothermal heat treatment at a cooling rate of 50° C./s or more. Thereafter, a tensile test and an impact test were performed on the heat-treated tensile test samples to measure the tensile strength and impact toughness of each of the tensile test samples. Specifically, the measurement was performed by ASTM E8M and ASTM E23.

In addition, Comparative Samples 6 to 12, having wire rod compositions outside the range of the present disclosure, showed deterioration in physical properties because of insufficient precipitation of fine carbides, remaining fresh martensite, or transformation into upper martensite having poor physical properties.

Furthermore, in this example, Inventive Sample 1 had a tensile strength of 1705 MPa and an impact toughness of 61 J, Inventive Sample 2 had a tensile strength of 1645 MPa and an impact toughness of 65 J, Inventive Sample 3 had a tensile strength of 1665 MPa and an impact toughness of 62 J, Inventive Sample 4 had a tensile strength of 1605 MPa and

TABLE 2

| | | Heating Temp. (° C.) | Primary Isothermal Heat Treatment | | Secondary Isothermal Heat Treatment | | Final Microstructure |
|---|---|---|---|---|---|---|---|
| Samples | | | Temp. (° C.) | Time (s) | Temp. (° C.) | Time (s) | |
| Inventive Material 1 | Inventive Sample 1 | 950 | 600 | 1000 | 250 | 6000 | LB, TM, FC, |
| | Comparative Sample 1 | 900 | 550 | 800 | 250 | 6000 | LB, TM |
| Inventive Material 2 | Inventive Sample 2 | 950 | 750 | 900 | 300 | 6500 | LB, TM, FC |
| | Comparative Sample 2 | 900 | 850 | 600 | 300 | 6500 | LB, TM |
| Inventive Material 3 | Inventive Sample 3 | 950 | 650 | 1100 | 270 | 8000 | LB, TM, FC |
| | Comparative Sample 3 | 950 | 650 | 1000 | 240 | 8000 | LB, TM, FM, FC |
| Inventive Material 4 | Inventive Sample 4 | 950 | 700 | 900 | 320 | 9000 | LB, TM, FC |
| | Comparative Sample 4 | 900 | 700 | 900 | 360 | 9000 | UB, LB, FC |
| Inventive Material 5 | Inventive Sample 5 | 950 | 800 | 1200 | 350 | 10,000 | LB, TM, FC |
| | Comparative Sample 5 | 840 | 800 | 1000 | 350 | 10,000 | LB, TM, CC |
| Comparative Material 1 | Comparative Sample 6 | 950 | 600 | 800 | 260 | 9000 | LB, TM, FM, FC |
| Comparative Material 2 | Comparative Sample 7 | 950 | 800 | 900 | 340 | 8000 | UB, LB, FC |
| Comparative Material 3 | Comparative Sample 8 | 950 | 600 | 1000 | 270 | 9000 | LB, TM |
| Comparative Material 4 | Comparative Sample 9 | 950 | 700 | 1000 | 340 | 9000 | LB, TM |
| Comparative Material 5 | Comparative Sample 10 | 950 | 600 | 800 | 260 | 10,000 | LB, TM, FC |
| Comparative Material 6 | Comparative Sample 11 | 950 | 700 | 800 | 300 | 9000 | LB, TM, FC |
| Comparative Material 7 | Comparative Sample 12 | 950 | 800 | 800 | 340 | 9000 | LB, TM, FC |

*In Table 2, LB refers to lower bainite, UB refers to upper bainite, FM refers to fresh martensite, TM refers to tempered martensite, FC refers to fine carbides having a size of 500 nm or less, and CC refers to coarse carbides greater than 500 nm.

Results of the measurement showed that all of Inventive Samples 1 to 5 have a tensile strength of 1600 MPa or more and an impact toughness of 60 J or more, whereas Comparative Samples 1 to 12 have a tensile strength of less than 1600 MPa or an impact toughness of less than 60 J. Specifically, Comparative Samples 1 to 5, having wire rod compositions within the range of the present disclosure but not satisfying heat treatment conditions of the present disclosure, showed deterioration in physical properties because of insufficient precipitation of fine carbides, remaining fresh martensite, transformation into upper martensite having poor physical properties, or coarse precipitates.

an impact toughness of 65 J, and Inventive Sample 5 had a tensile strength of 1622 MPa and an impact toughness of 63 J.

In addition, Comparative Sample 1 had a tensile strength of 1741 MPa and an impact toughness of 37 J, Comparative Sample 2 had a tensile strength of 1636 MPa and an impact toughness of 41 J, Comparative Sample 3 had a tensile strength of 1787 Pa and an impact toughness of 34 J, Comparative Sample 4 had a tensile strength of 1512 MPa and an impact toughness of 35 J, Comparative Sample 5 had a tensile strength of 1626 MPa and an impact toughness of 46 J, Comparative Sample 6 had a tensile strength of 1692 MPa and an impact toughness of 35 J, Comparative Sample 7 had a tensile strength of 1591 MPa and an impact toughness of 52 J, Comparative Sample 8 had a tensile strength of 1644 MPa and an impact toughness of 34 J, Comparative Sample 9 had a tensile strength of 1578 MPa and an impact toughness of 54 J, Comparative Sample 10 had a tensile strength of 1704 MPa and an impact toughness of 30 J, Comparative Sample 11 had a tensile strength of 1628 MPa and an impact toughness of 26 J, and Comparative Sample 12 had a tensile strength of 1477 MPa and an impact toughness of 32 J.

The present disclosure is not limited to the embodiments and examples described above, and various different forms may be manufactured according to the present disclosure. Those of ordinary skill in the art to which the present disclosure pertains will understand that other specific forms may be provided without departing from the technical spirit or features of the present disclosure. Therefore, the embodiments and examples described above should be considered in a descriptive sense only and not for purposes of limitation.

The invention claimed is:

1. A high-strength heat-treated part with high resistance to hydrogen-delayed fracturing, the high-strength heat-treated part having a chemical composition comprising, by wt %, C: 0.3% to 0.5%, Si: 0.01% to 0.3%, Mn: 0.3% to 1.0%, Cr: 0.5% to 1.5%, Mo: 0.5% to 1.5%, Ni: 0.5% to 2.0%, V: 0.01% to 0.4%, and a balance of Fe and other impurities, the chemical composition satisfying the relational expression 1 below, the high-strength heat-treated part has a microstructure comprising, by area %, 5% to 20% auto-tempered martensite and a balance of lower bainite, $$1.21Cr+3.94Mo+15V \geq 3.567 \quad \text{[Condition 1]}$$

where Cr, Mo, and V respectively refer to a content thereof in wt %.

2. The high-strength heat-treated part of claim 1, wherein the microstructure of the high-strength heat-treated part comprises CrC, MoC, and VC as carbides having an average size of 500 nm or less.

3. The high-strength heat-treated part of claim 1, wherein the high-strength heat-treated part has a tensile strength of 1600 MPa or more and an impact toughness of 60 J or more.

* * * * *